May 18, 1954 E. E. MASTERSON 2,678,820

REELING SYSTEM

Filed Oct. 30, 1951 2 Sheets-Sheet 1

INVENTOR
Earl E. Masterson
BY Morris A. Rabkin
ATTORNEY

May 18, 1954 E. E. MASTERSON 2,678,820

REELING SYSTEM

Filed Oct. 30, 1951 2 Sheets-Sheet 2

INVENTOR
Earl E. Masterson
BY Morris J. Calkin [signature]
ATTORNEY

Patented May 18, 1954 2,678,820

UNITED STATES PATENT OFFICE 2,678,820

REELING SYSTEM

Earl E. Masterson, Palmyra, N. J., assignor to Radio Corporation of America, a corporation of Delaware Application October 30, 1951, Serial No. 253,888

7 Claims. (Cl. 271—2.3)

Figure 1:
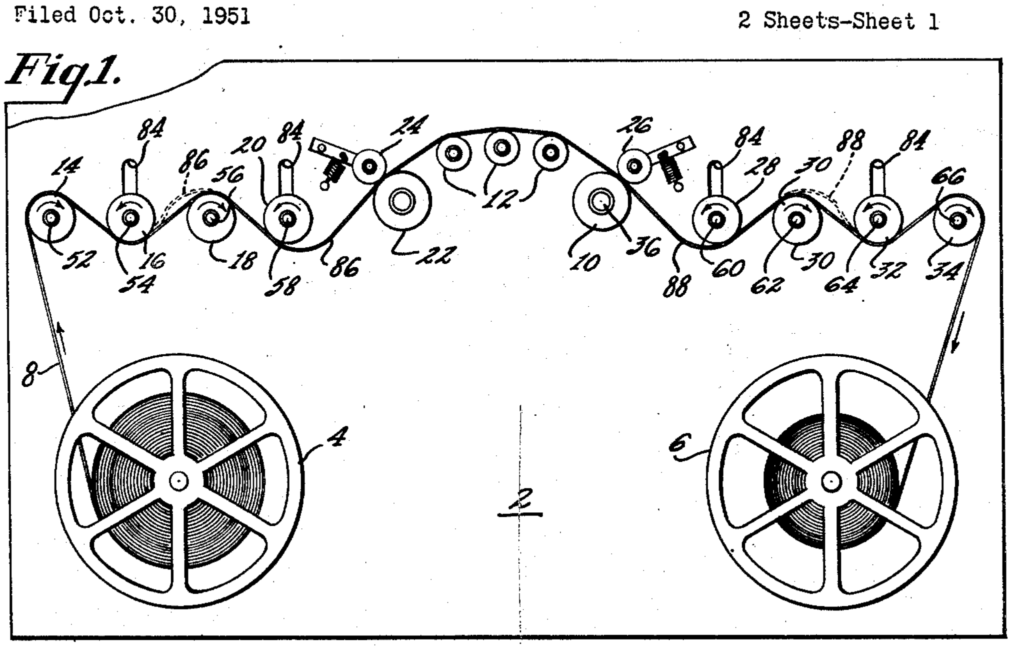

The present invention relates to reeling systems, and more particularly to systems suitable for reeling a non-perforated tape recording medium.

In the art of recording on and reproducing from tape-like sound records it has been found desirable to drive the record medium past associated signal transducing means at a constant velocity. Any irregularities in the motion of the medium will result in a distorted recording or reproduction. It has been found that irregular motions may be imparted to medium by irregularities in the motion of the tape leaving its supply reel or being wound onto its take-up reel. To overcome these irregularities, many attempts have been made to isolate the portion of the tape adjacent to the transducer from the influence of the reels. With perforated tape, such as motion picture film wherein the film is positively driven by sprockets engaging the perforations, the solution was fairly simple. An unsupported or soft loop of film was provided on both sides of the transducer. Because of the positive drive, such a soft loop could be maintained. Irregularities due to the reel motion would be taken up in the soft loop, leaving the portion of the film adjacent to the transducer unaffected.

However, with non-perforated tape, such as that used with magnetic recording apparatus, the solution is not so simple. Since there are no perforations or sprocket holes, the tape must be frictionally driven. Being frictionally driven, the tape is conventionally under substantial tension throughout its length between the supply reel and the take-up reel. In an effort to isolate the portion of the tape adjacent to the transducers from the effect of the irregularities of the reels under such conditions, resort has been had to mechanical damping means of one type or another. Such damping means have not proven entirely satisfactory since they provide, at best, only an attenuation of the irregularity.

It is, accordingly, an object of the present invention to provide means, in an improved tape reeling system, for isolating a portion of the travelling tape from the irregularities of motion of the reels.

It is another object of this invention to provide a tape reeling system as set forth characterized in that means are provided for developing and maintaining a soft loop in a travelling unperforated tape.

A further object of this invention is to provide a reeling system as set forth wherein a soft loop in the tape is developed and maintained between associated transducers and the supply reel and another soft loop is developed and maintained between the transducers and the take-up reel.

In accomplishing these and other objects, there has been provided, in accordance with the present invention, a capstan for driving the tape at a constant linear speed. A plurality of feed rollers are sequentially positioned between the capstan and the conventional supply reel. These feed rollers are driven at a tangential velocity greater than that of the capstan and preferably at successively higher velocities in the order of their sequence. A similar set of rollers, which will hereinafter be called take-up rollers, is positioned between the capstan and the conventional take-up reel. The take-up rollers are driven at a tangential velocity less than that of said capstan and preferably at successively higher velocities in the order of their sequence. Between the last of the feed rollers and the capstan there is provided a hold-back device which exerts a substantially constant drag on the tape. The rollers define a sinuous or serpentine path for the tape which lies alternately on opposite sides of the rollers in each set, alternate ones of the rollers in each set being driven in opposite directions. This arrangement develops and maintains a soft loop in the tape between the holdback device and the feed rollers and another loop between the capstan and the take-up rollers.

Figure 2:
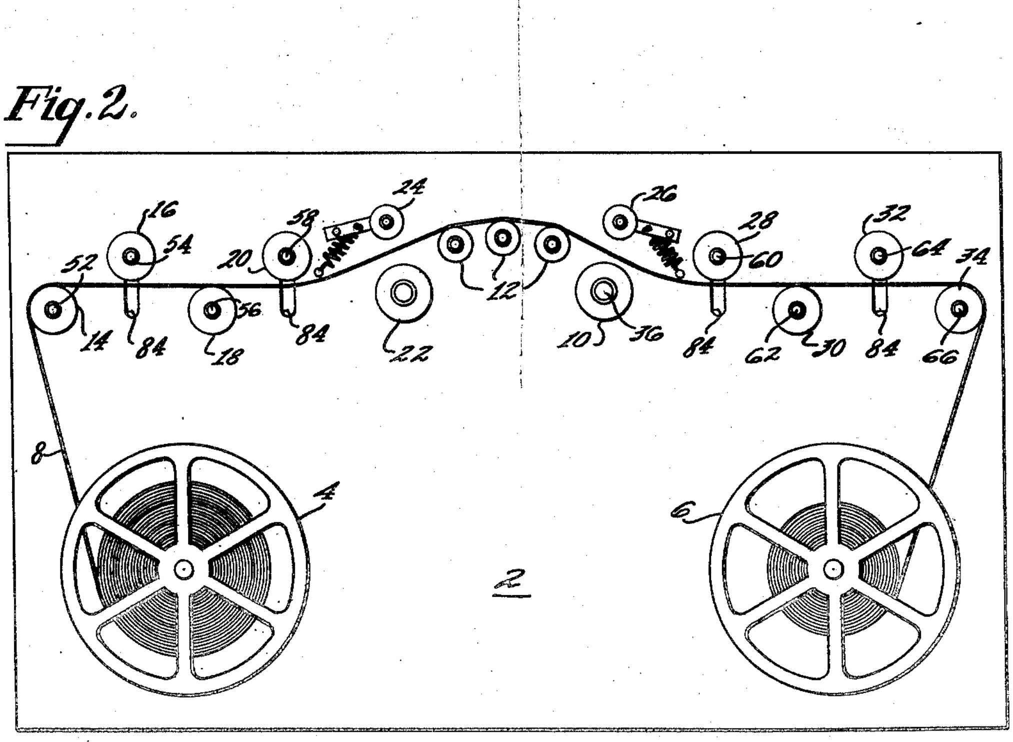
Figure 3:
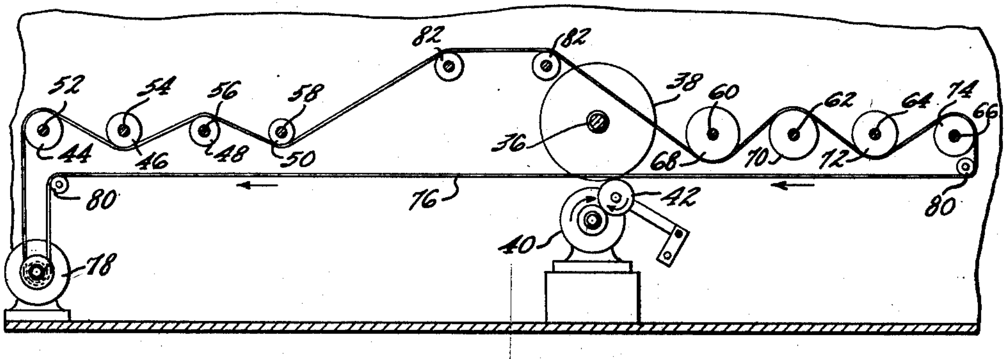
Figure 4:
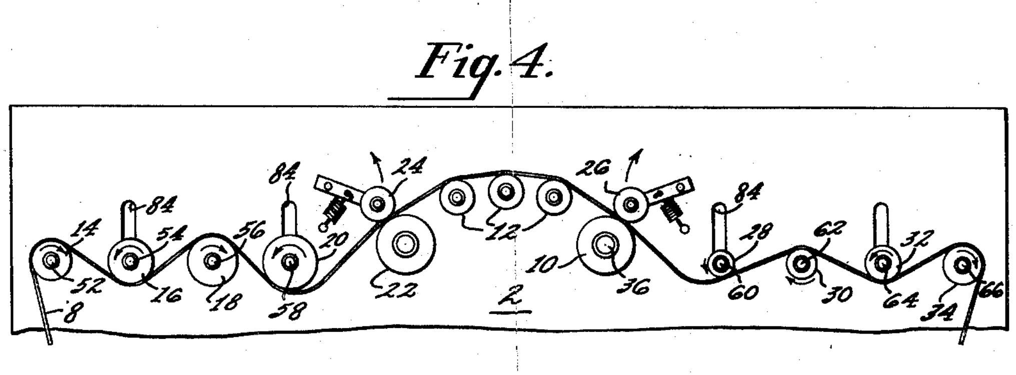
Figure 5:
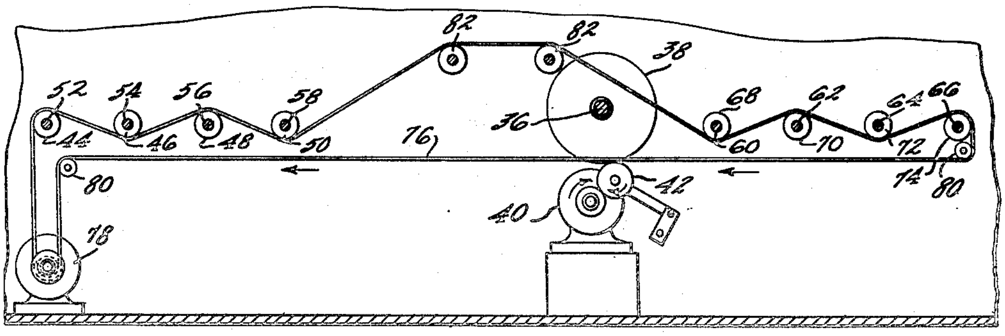

A better understanding of the present invention may be had from the following detailed description when read in connection with the accompanying drawings wherein:

Figure 1 is a front elevational view of apparatus embodying the invention,

Figure 2 is a view similar to Figure 1 but shown in a condition for easy threading of the tape into the machine, Figure 3 is a front view showing a driving system for the apparatus of Figure 1, Figure 4 is a view similar to that of Figure 1 but showing the apparatus in modified form, and Figure 5 is a view similar to that of Figure 3 but showing a driving system for the apparatus as shown in Figure 4.

Referring to the drawings in more particularity, there is shown a mounting panel 2 upon which is supported a supply reel 4 and a take-up reel 6. A record tape 8 travels through the reeling system from the supply reel to the take-up reel, being driven by a conventional capstan 10. As in conventional systems, means (not shown) are provided for imparting a drag to the supply reel such that the reel tends to resist the removal of the tape therefrom. Also as in conventional systems, the take-up reel is overdriven, that is, means (not shown) are provided tending to drive the take-up reel at a speed in excess of that necessary to take up the tape being fed thereto by the reeling system. Well known means, such as a friction clutch, is provided to permit slippage between the reel and its source of driving power. Thus, the actual speed at which the take-up reel rotates is determined by the linear velocity of the tape being fed thereto.

Adjacent to the capstan 10, there is shown a set of three transducers 12. For purposes of illustration, these transducers may be, respectively, erase, record and playback heads. Between the transducers 12 and the supply reel 4, there is positioned a plurality (four being shown) of feed rollers, 14, 16, 18 and 20. Two of these rollers 14 and 18 are driven in a clockwise direction while the other two 16 and 20 are driven in a counterclockwise direction. The surface or tangential velocity at which the rollers are driven is greater than the tangential velocity of the capstan. (To be discussed in more detail hereinafter.) Between the transducers and the last of the feed rollers 20 there is provided a holdback device 22 for imparting a substantially constant drag on the tape. This may be of any conventional design such as a spring loaded friction pad or, as illustrated, a friction loaded roller. An adjacent pressure roller 24 assures an intimate contact between the drag roller and the tape. A similar pressure roller 26 is associated with the capstan 10 to assure an intimate driving contact between the capstan and the tape.

A second set of rollers 28, 30, 32 and 34 (four of these are also shown) is sequentially positioned between the capstan and the take-up reel. These rollers, which, for purposes of nomenclature will be called take-up rollers, are driven at a tangential velocity less than that of the capstan. Alternate ones of these rollers are driven in opposite directions, as were the feed rollers. The feed rollers and the take-up rollers define a sinuous or serpentine path for the tape. That is, the respective sets of rollers are arranged substantially in a straight line. The tape, leaving the supply reel, first passes over the feed roller 14, then under the roller 16, over the roller 18, and under the roller 20. Then, it goes past the holdback device 22, the transducer 12, and the capstan 10, in that order. Leaving the capstan, the tape passes under the take-up roller 28, over the roller 30, under the roller 32, and over the roller 34, to the take-up reel 6.

In a preferred embodiment of this invention, the successive feed rollers are driven at progressively greater tangential velocities in the order of their sequence. That is, the second roller 16 is driven so that its tangential velocity is slightly greater than that of the first roller; the third roller 18 is faster than the second, and the fourth 20 is faster than the third. Similarly, the successive take-up rollers are driven at progressively greater tangential velocities in the order of their sequence. The first roller 28 is the slowest of the set while the last roller 34 is the fastest one.

Such a speed relationship may be accomplished in any of several ways. Two means for obtaining the desired result are illustrated in the drawings. In Figures 1 and 3 one system is shown wherein the rollers are all of the same diameter and are driven at different angular velocities.

In Figures 4 and 5, the angular velocity of all of the rollers is the same, but the rollers differ in diameter.

In Figures 3 and 5, there is shown a drive system for the apparatus as shown in Figures 1 and 4 respectively. The capstan 10 is secured to a shaft 36 which is, in turn, secured to a flywheel 38. A constant speed motor 40 is coupled, through an idler 42, to drive the capstan flywheel in the desired direction at the desired constant speed. Each of the feed rollers 14—20 is secured to corresponding drive pulleys 44—50 through appropriate shafts 52—58. Similarly, each of the take-up rollers is connected through appropriate shafts 60—66, to corresponding drive pulleys 68—74. An endless belt 76 is driven by a constant speed motor 78. The belt engages the drive pulleys associated with both sets of rollers, following a path about the pulleys substantially similar to that followed by the tape in passing through the reeling system. Suitable guide rollers or idlers 80 are provided to define a return path for the belt 76. A second pair of idlers 82 are positioned between the two sets of drive pulleys to guide the belt in a desired path between the two sets of pulleys.

As the belt 76 is driven by the motor 78 at a constant linear velocity, the tangential velocity of all of the drive pulleys will be substantially the same as the linear velocity of the belt. In the system shown in Figure 3, since the several pulleys differ from each other in diameter, the angular velocity of the pulleys will differ from each other inversely as their respective diameters. Since the diameters of the rollers (Figs. 1 and 2) are the same, the tangential velocities of the rollers will differ from each other proportionately with their respective angular velocities. On the other hand, in the system shown in Figure 5, the pulleys are all of the same diameter; hence their angular velocities will be the same. However, the rollers connected to these pulleys (Figure 4) differ from each other in diameter. With this arrangement, the tangential velocities of the rollers will differ from each other directly as their diameters. Thus it appears that with either of the illustrated systems, the desired result is obtained. That is, the tangential velocity of successive ones of said feed rollers and of said take-up rollers is progressively greater in the order of their respective sequences.

Another feature of this invention is that certain of the rollers are made retractable or translationally movable in order to provide a substantially straight line path for the tape when it is being threaded into the machine. It will readily be appreciated that with the serpentine tape path illustrated in Figures 1 and 4, the initial threading of the tape into the apparatus would be difficult and time consuming. In order to relieve this difficulty, alternate ones of the feed rollers and of the take-up rollers are arranged to be moved out of their normal operating positions to positions removed from the tape path, as shown in Figure 2. Slots 84 are provided in the mounting panel 2 to accommodate the movement of the shafts 54, 58, 60, 64 to which the selected rollers are attached. Any suitable means may be provided for effecting the movement of the rollers such as cams, linkages or combinations of these. Since such mechanisms are well known, they have not been illustrated.

In operation, the tape 8 is pulled by the reeling system, from the supply reel 4. Since there is a drag imparted to the supply reel which tends to resist the removal of the tape therefrom, tension is developed in the tape. The tape passes sequentially, in its serpentine path, about the feed rollers 14—20. There are no pressure rollers associated with the feed rollers as there is with the capstan. Consequently, it is only the tension in the tape that tends to maintain driving contact between these rollers and the tape. The capstan, with its associated pressure roller 26 affords a relatively positive drive because the tape is pressed into close contact with the capstan by the pressure roller. Thus, there is little, if any, slip between the tape and the capstan. On the other hand, the driving contact between the tape and the several feed rollers is dependent upon the frictional engagement therebetween which is a function of the tension in the tape as it engages the respective rollers. Now, the actual linear velocity of the tape is determined by the tangential velocity of the capstan. The isolated or constant speed portion of the tape is that portion adjacent to the transducer 12, or between the holdback device 22 and the capstan.

Since the tape is flexible, it cannot be pushed through the holdback or drag device. It must be pulled through from the opposite side. Thus, the tape will be pulled through the holdback device only at the speed determined by the capstan. The drag imposed on the tape by the holdback device imparts a tension in the tape as it passes the transducers.

Inasmuch as the feed rollers are being driven at a tangential velocity greater than that of the capstan, they attempt to feed more tape to the holdback device 22 than the capstan will pull through. Thus, there is a soft loop 86 formed in the tape between the feed rollers and the holdback device.

It would appear that this loop 86 in the tape would continue to grow in length in accordance with the difference in speed between the rollers and the capstan. However, with the formation of the loop, the tension in the tape adjacent to the feed rollers lessens, resulting in a corresponding lessening of the traction between the rollers and the tape. With the lessening of the traction, more slip is introduced between the tape and the feed rollers, since back tension in the tape is supplied by the drag on the supply reel. The system will become stabilized at the loop length at which the feed rollers have sufficient traction to remove the tape from the supply reel at the same linear velocity at which the tape is being driven by the capstan. Thus, any irregularities in the motion of the supply reel will be taken up by the soft loop without subjecting the constant speed portion of the tape to those irregularities.

Similarly, a soft loop 88 is formed between the capstan and the take-up rollers 28—34. The capstan is driven at a higher tangential velocity than the take-up rollers. Hence, it tends to feed the tape to these rollers a rate in excess of their capacity, forming the loop. Since the take-up reel 6 is over driven, tending to rotate at a rate faster than that permitted by the tape, the take-up rollers act as a holdback means. Here, as in the case of the feed rollers, the formation of the loop causes a corresponding lessening of the traction between the tape and the take-up rollers. The tension introduced as a result of the over driven take-up reel produces a slippage between the tape and the take-up rollers. As before, the systems will become stabilized at the loop length at which the take-up rollers have sufficient traction to allow the tape to be fed to the take-up reel at the same linear velocity at which the tape is being driven by the capstan.

When, as in the illustrated preferred embodiment of the invention, successive ones of the feed rollers and of the take-up rollers are driven at progressively greater speeds in the order of their sequences, the speed differential between adjacent ones of the rollers in each set tends to maintain a tension in the tape, maintaining the tractive effort of the several rollers. However, as the loop size increases, traction is lost by the rollers in the order of their displacement from the constant speed portion of the tape. Conversely, as the loop size decreases, traction is increased in the reverse order, tending to increase the size of the loop.

It should now be apparent to those skilled in the art, that there has been provided, in accordance with the present invention, an improved reeling system for non-perforated tape characterized in that a constant speed portion of the tape is isolated from irregularities that might be introduced from either reel by soft loops in the tape.

What is claimed is:

1. In a tape reeling system for reeling a flexible tape from a supply reel to a take-up reel, a capstan for driving the tape, means for driving said capstan at a predetermined constant speed, a plurality of feed rollers sequentially positioned between said capstan and the supply reel, means for driving said feed rollers at a tangential velocity greater than that of said capstan, alternate ones of said feed rollers being driven in opposite directions, and means intermediate said capstan and said feed rollers for applying a substantially constant drag on the tape, said feed rollers defining a serpentine path for the tape which lies on opposite sides of alternate ones of said rollers.

2. The invention as set forth in claim 1 wherein the tangential velocity of successive ones of said feed rollers is progressively greater in the order of their sequence.

3. The invention as set forth in claim 2 wherein said feed rollers are driven at the same angular velocity, the diameter of successive ones of said rollers being progressively greater in the order of their sequence.

4. The invention as set forth in claim 2 wherein said feed rollers are of substantially the same diameter, the angular velocity of successive ones of said rollers being progressively greater in the order of their sequence.

5. The invention as set forth in claim 1 wherein alternate ones of said feed rollers are selectively, translationally movable to a position removed from said serpentine path whereby to provide a substantially straight line path for threading said tape into said reeling system.

6. In a tape reeling system for reeling a flexible tape from a supply reel to a take-up reel, a capstan for driving said tape, means for driving said capstan at a predetermined constant speed, a plurality of feed rollers sequentially positioned between said capstan and the supply reel, means for driving said feed rollers at a tangential velocity greater than that of said capstan, alternate ones of said feed rollers being driven in opposite directions, means intermediate said feed rollers and said capstan for applying a substantially constant drag on the tape, a plurality of take-up rollers sequentially positioned between said capstan and the take-up reel, and means for driving said take-up rollers at a tangential velocity less than that of said capstan, said feed rollers and said take-up rollers defining a serpentine path for the tape which lies on opposite sides of alternate ones of said feed rollers and of said take-up rollers.

7. The invention as set forth in claim 6 wherein the tangential velocity of successive ones of said feed rollers and of said take-up rollers is progressively greater in the order of their respective sequences.

References Cited in the file of this patent

UNITED STATES PATENTS

| Number | Name | Date |
|---|---|---|
| 1,587,051 | Thompson | June 1, 1926 |
| 1,867,343 | Wittek | July 12, 1932 |
| 1,909,074 | Reynolds | May 16, 1933 |
| 1,949,237 | Bradner | Feb. 27, 1934 |
| 2,043,829 | Grant et al. | June 9, 1936 |
| 2,338,143 | Taylerson | Jan. 4, 1944 |
| 2,517,861 | Franklin | Aug. 8, 1950 |